Jan. 2, 1945.　　　D. H. CAMERON　　　2,366,383
AUTOMATIC RECORDER
Filed March 27, 1937　　　3 Sheets-Sheet 1
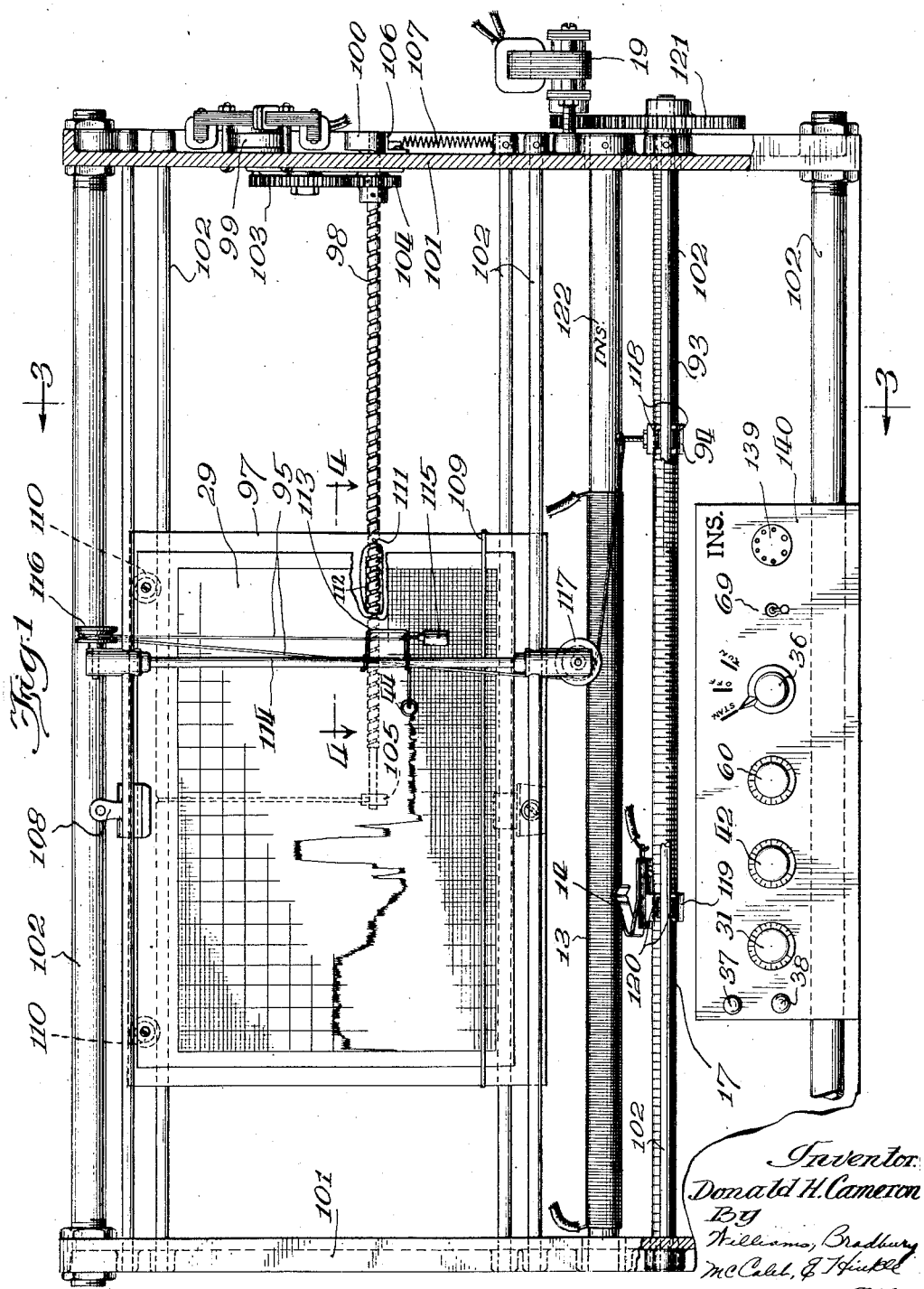

Jan. 2, 1945.  D. H. CAMERON  2,366,383
AUTOMATIC RECORDER
Filed March 27, 1937  3 Sheets-Sheet 2
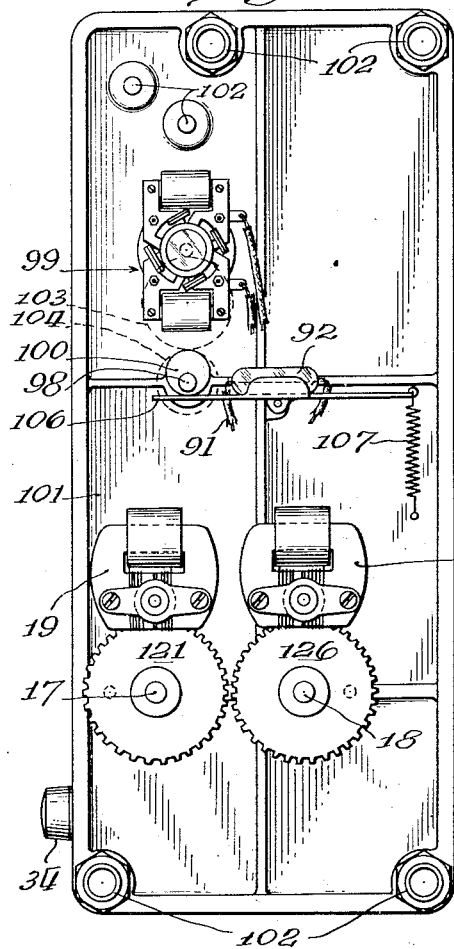
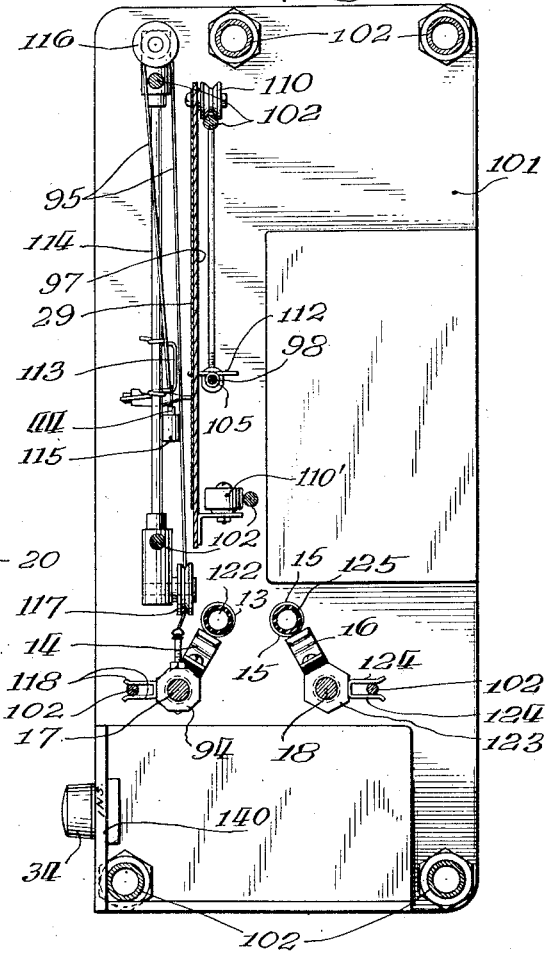
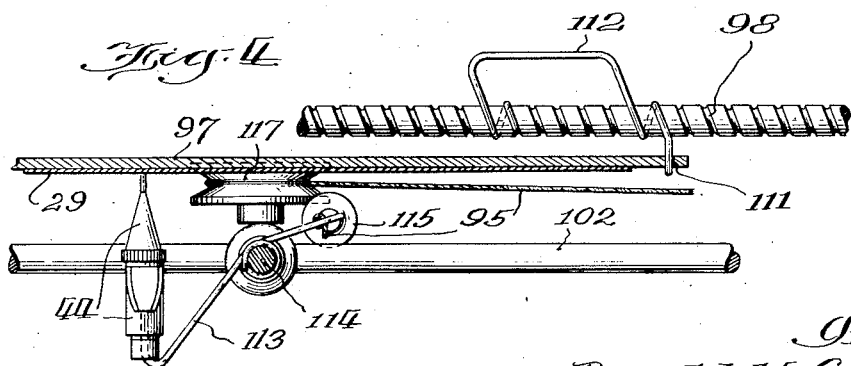
Inventor.
Donald H. Cameron
By Williams, Bradbury, McCaleb & Hinkle
Attys.

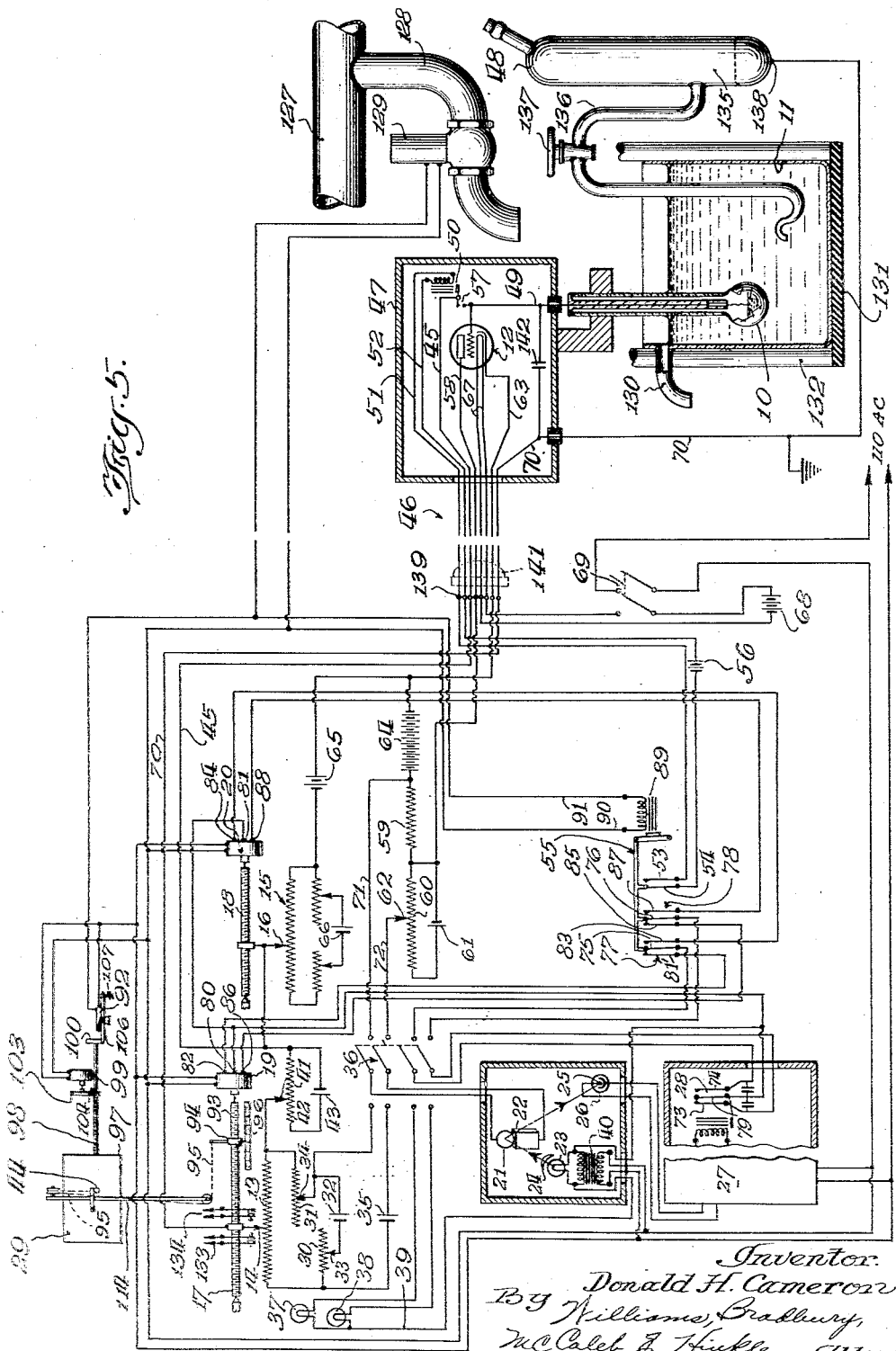

Patented Jan. 2, 1945

2,366,383

UNITED STATES PATENT OFFICE 2,366,383

AUTOMATIC RECORDER

Donald H. Cameron, Racine, Wis., assignor to B. D. Eisendrath Tanning Co., Chicago, Ill., a corporation of Illinois Application March 27, 1937, Serial No. 133,333

10 Claims. (Cl. 234—71)

This invention relates to automatic recorders, and has for its principal object to provide an improved recorder for automatically making permanent records of physical conditions.

While the invention may be embodied in recorders for various physical conditions, it will be described herein in its specific application to recording hydrogen ion concentration. It is, however, clearly to be understood that the invention is not intended to be limited to its hydrogen ion application since it may be utilized to record any electric effect or any physical effect which can be transformed into an electric effect.

The invention will be fully understood from the following description of a preferred embodiment thereof, taken in conjunction with the accompanying drawings, in which:

Figure 1 is a front elevation of a recorder embodying my invention, parts of the recorder being shown in section for the sake of better illustration;

Fig. 2 is an end elevation of the recorder as viewed from the right in Fig. 1;

Fig. 3 is a sectional elevation through my recorder, taken on the line 3—3 of Fig. 1;

Fig. 4 is a sectional plan detail taken on the line 4—4 of Fig. 1; and

Fig. 5 is a wiring diagram.

Referring to the drawings, and particularly to Fig. 5, the reference numeral 10 designates a glass electrode which is adapted to be inserted in a container 11. The reference numeral 12 designates a thermionic tube, the grid of which is connected to the glass electrode 10.

The apparatus comprises a main potentiometer 13, which cooperates with a movable contact 14, and also a standardizing potentiometer 15, which cooperates with a movable contact 16. The contacts 14 and 16 are adapted to be moved along their potentiometers by means of screws 17 and 18, respectively. These screws are driven by reversing motors 19 and 20.

The output of the tube 12 is connected to a moving coil galvanometer 22, the coil of which carries a mirror 21. A lamp 23 and lens 24 direct a beam of light towards the mirror 21. As the galvanometer coil swings, that beam of light is adapted to hit the target 25 of a photoelectric cell 26. The output of the photoelectric cell is connected to a suitable amplifier 27, which controls a relay switch 28.

The movements of the contact 14 are recorded on chart 29 in a manner which will be more fully described hereinafter. The movements of the contact 16 are for the purpose of standardizing the device and correcting changes due to loss of voltage by the cells, etc.

The potentiometer 13 is adjusted so that the movement of the contact 14 is adapted to the scale of the chart 29. Thus, in the case of a pH recorder, each degree change in pH may give, for example, a voltage change of 59 millivolts and the potentiometer 13 should be arranged to have a potential drop of approximately 59 millivolts for each pH space unit on the chart. Thus, if the potentiometer 13 is 15 inches long and we have fourteen space units in the vertical direction on the chart 29, then we must have a potential drop of 826 millivolts on fourteen space units of the potentiometer 13.

Opposite ends of the potentiometer 13 are connected to rheostats 30 and 31. An operating cell 32 is connected to contact points 33 and 34 which cooperate with the rheostats 30 and 31, respectively. The rheostat 30 is connected to a standard cell 35 which may be connected to the galvanometer 21 by means of the four-pole, double-way switch 36 when manually thrown to the left, as viewed in Fig. 5. When thus thrown the galvanometer is also connected to the contact 34. The rheostat 30 is then adjusted to bring the galvanometer deflection to zero so that the cell 32 balances the cell 35. This may be done daily.

The galvanometer 22, the lamp 23 and the photoelectric cell 26 are preferably located in a box or chamber to protect the photoelectric cell 26 from extraneous light. A peep hole may be provided in this box to enable the galvanometer to be observed directly. I prefer, however, to provide two incandescent lamps 37 and 38 which are connected by the manual switch 36 to the relay 28 which is controlled by the amplifier 27. The circuit through the lamps 37 and 38 is completed by a conductor 39 which is in parallel with the lamp 23, both the circuit 39 and the lamp 23 deriving energy from a transformer 40 which is connected to the alternating current lines.

When the switch 36 is turned to the left and the contact 33 is adjusted, the galvanometer 22 will be deflected until the beam of light is reflected by the mirror 21 onto the target of the photoelectric cell 26, sufficiently so that the amplifier 27 is energized and closes the circuit through the lamp 37. The contact 33 is now moved in the opposite direction until the lamp 38 becomes illuminated. The relay system may be made so sensitive that between these two points the cell 32 is substantially in balance with the cell 35. It may be noted that the relay 28 is biased towards closing towards the left, as viewed in Fig. 5. Now that the working cell 32 has been standardized for the day, the switch 36 is thrown to the right and the potentiometer 13 is operated from cell 32. This potentiometer has previously been calibrated, preferably at the factory, by suitable movement of the contact 34 so as to bring the number of millivolts on the potentiometer 13 to the value desired per unit of distance, for example, centimeter or half inch, depending upon the work which the device is intended to do and the scale of the paper which is being used.

One end of the potentiometer 13 is connected to a contact 41 which cooperates with the potentiometer 42. This potentiometer is energized by a cell 43. It will be obvious that manual movement of the contact 41 will cause a certain amount of displacement of the contact 14 when that contact subsequently comes to its position of balance. The purpose of the contact 41 and potentiometer 42 is to enable the position of the recording pen 44 to be manually adjusted on the chart 29.

It may be conveniently indicated here that when using this recorder for pH purposes, a vessel 11 containing a solution of known pH is in cooperative relation with the glass electrode 10. If we suppose the solution has a pH of 7 and the pen 44 reads around 4 on the chart, then simple manual movement of the pointer 41 will bring the pen 44 up to 7 on the chart. One end of the potentiometer 42 is connected to the movable contact 16 and both are connected to a conductor 45 which extends through a cable 46 into a housing 47 in which the thermionic tube 12 is located. It may here be noted that the cable 46 may be of any desired length and that the housing 47, the glass electrode 10, vessel 11 and another electrode 48, which may suitably be a KCl-calomel electrode, are associated together as a remote unit. The glass electrode is connected by a very short lead 49 to the grid of the tube 12. This lead must be very short or it must be very effectively shielded in order to avoid picking up electrical oscillations.

The housing 47 includes a relay 50 which is adapted to be energized by conductors 51 and 52 which extend through the cable 46 and are connected to the poles 53 and 54 of a switch 55. A suitable source of energy, for example a battery 56, may be located in the conductor 52 to provide current for energizing the relay 50 when the switch 55 is closed. The armature 57 of the relay is adapted, when the latter is energized, to move into contact with the conductor 49, becoming thereby directly connected to the grid of the tube 12. The armature 57 is connected to the conductor 45. The plate of the tube 12 is connected by a conductor 58 to one end of a resistor 59 and one end of a manually operable potentiometer 60. This potentiometer is provided with a cell 61 and a contact 62. The cathode of the tube 12 is connected by a conductor 63 to the negative side of a "B" battery 64 and the positive side of a "C" battery. The negative side of the "C" battery 65 is connected to one end of the potentiometer 15. This potentiometer is provided with a cell 66. The heater conductors 67 of the tube 12 also pass through the cable 46 to the control unit. The heater current is provided by a suitable battery 68 and the circuit is adapted to be controlled by one of the poles of a double-pole switch 69. The other pole of the switch 69 may control the supply of A. C. current to the set. The terminal of the electrode 48 is connected to a conductor 70 which extends through the cable 46 and is connected to the contact 14.

The other end of the resistor 59, that is, the end remote from the conductor 58, is connected to the positive side of the "B" battery 64, and this common side is connected to a conductor 71. The contact 62 is connected to a conductor 72 and the conductors 71 and 72 are adapted to be connected to the galvanometer 21 when the switch 36 is thrown to the right, as viewed in Fig. 5. When the manual switch 36 is thrown to the right, contacts 73 and 74 of the single-pole double-throw switch 28 are connected to the poles 75 and 76 respectively, of two single-pole double-throw switches 77 and 78. The pole 79 of the switch 28 is connected to terminals 80 and 81 of the two reversible motors 19 and 20. The contact 81' of the switch 77 is connected to the contact 82 of the motor 19. The contact 83 of the switch 77 is connected to the contact 84 of motor 20. The contact 85 of the switch 78 is connected to the contact 86 of the motor 19. The contact 87 of the switch 78 is connected to the contact 88 of the motor 20.

The poles of the switches 77, 78 and 55 are connected together and are adapted to be operated by a relay 89. When this relay is energized, the poles are drawn to the right as viewed in Fig. 5, pole 75 is brought into engagement with contact 83, pole 76 is brought into engagement with contact 87, and pole 54 is brought into engagement with contact 53. When the relay 89 is de-energized, the poles move away from these contacts and the pole 75 makes engagement with the contact 81 and the pole 76 makes engagement with the contact 85. The relay 89 is connected to conductors 90 and 91. The conductor 90 is connected to one of the 110 A. C. lines. The conductor 91 is connected to a switch 92 which is connected to the other 110 A. C. line. The switch 92 is suitably a mercury switch, which is closed periodically by a cam 100.

The screw 17 is made continuous with a screw 93 of smaller pitch. The ratio of pitch between the screws 17 and 93 is merely a matter of convenience, the screw 17 carrying the contact 14 and the screw 93 carrying a nut 94 which is connected by a flexible member 95 to the pen 44. The nut 94 may comprise a pointer which cooperates with a fixed scale 96 so that the reading of the device at any particular time may be read directly. The chart 29 is carried on a plate 97 which is driven continuously and uniformly at a slow rate of speed by means of screw 98. This screw may be driven by a synchronous clock motor 99 and the cam 100 may suitably be mounted on its outermost end.

The physical embodiment of the invention will be more readily understood from Figs. 1 to 4 inclusive. The main part of the apparatus, that is, the part represented on the left-hand side of Fig. 5, may be housed in a suitable cabinet which may comprise end frames 101 secured together by suitable bars 102. On one of the end frames 101 the clock motor 99 is mounted. This motor is connected by means of gears 103 and 104 to the screw 38. The motor 99 is driven at a constant speed from the power lines and the screw 98 is driven at a definite speed, depending upon the units employed. Thus, the chart 29 may be advanced at the rate of 1" per hour, ½" per hour, or one centimeter per hour, depending upon the paper employed. The different ratios may be obtained in several ways. Thus, the gears 103 and 104 may be replaced by gears of suitable ratio or a screw 98 of different pitch may be employed. One end of the screw 98 has a bearing in one of the frames 101 and the other end has a bearing 105 supported from one of the rods 102. The cam 100 is mounted adjacent the plate 106 which is pivotally mounted on the frame member. The plate 106 is normally held against the cam 100 or the shaft 98 by means of a spring 107. The switch 92 is carried by the plate 106. This switch is adapted to be closed for a short time only during each revolution of the shaft 98.

The plate 97 is somewhat larger than the chart 29 which is applied thereto. The chart may be held in position on the plate 97 by any suitable means, for example, by means of clips 108 and rubber bands 109. The plate is mounted for easy movement in a horizontal direction. Thus, it may carry rollers 110 near its upper edge which ride on one of the bars 102 to support the plate. It may also carry a roller 110' near the lower end which rides upon another of the bars 102. The plate 97 may have an opening 111 through which extends a projection of a nut member 112 which rides on the screw 98. The nut member 112 may suitably consist of a stout wire formed with convolutions corresponding to the thread of the screw 98.

A vertical rod 114 is mounted on two of the rods 102 about half way between the two frames 101. A pen carriage 113, which may suitably be a piece of wire bent to provide two loops around the rod 114, is freely slidable upon the rod 114. An end of the wire carriage extends to one side of the rod 114 and carries the pen 44. A portion of the carriage extends to the other side of the rod 114. A weight 115 is mounted on this portion and the cord 95, which may suitably be a silk fishing line, is attached thereto. The cord 95 extends upwardly and slightly forwardly to a pulley 116 at the upper end of the rod 114. The cord passes over the pulley 116 and extends downwardly to a pulley 117 from which it extends substantially horizontally to the nut 94 to which it is secured. The weight 115, in conjunction with the forward obliquity of the length of the cord 95 (as best seen in Fig. 3), which supports it, results in the pen 44 being yieldingly held against the chart 29.

The nut 94 is held against rotation by means of projections 118 which straddle one of the bars 102 which connect the two end plates 101. The contact 14 is carried on a nut 119 which is moved back and forward by the screw 17. The nut 119 is provided with projections 120 which straddle one of the bars 102 to keep the nut from rotating. The screw 17, 93 is rotatably mounted in bearings in the end plates 101 and a projecting end thereof carries a gear 121 which is driven by the motor 19. This motor may suitably be a reversible motor of known type, which is a single phase, shaded pole induction motor provided with shaded poles adapted, when the appropriate shading circuit is completed, to operate in one direction or the other. Thus, when contact 80 is connected to contact 86, a shading circuit is completed which causes the motor 19 to move the contact 14 in a direction to effect the movement of the galvanometer beam towards the target of the photoelectric cell 26. When the contact 80 is connected to contact 82, the motor is caused to rotate in the opposite direction and the beam of light moves away from the target of the photoelectric cell 26. When no current is passing through the galvanometer 21, the beam of light reflected by the mirror 22 just hits the edge of the target.

The potentiometer 15 comprises a winding mounted upon a bar 122 of insulating material extending between the frame members 101, so that the contact 14 is able to engage the winding. The contact 16 is mounted on a nut 123 carried by the screw 18. The nut is prevented from rotation by projections 124 which engage one of the bars 102. The contact 16 engages the potentiometer 15 which is wound on a bar 125 carried by the end plates 101 in the same manner as the bar 122. It may here be noted that the screw 18 may be much finer than the screw 17. The screw 18 carries a gear 126 which is adapted to be driven by the motor 20. When the contacts 81 and 82 are connected together, the motor operates in one direction and when the contacts 81 and 84 are connected together, the motor operates in the opposite direction. It may here be noted that operation of the motor tends to bring the galvanometer 22 to null point position, that is, with the light reflected from the mirror 21 just hitting the target of the photoelectric cell 26.

In each case there is a certain small amount of overrunning and at the end of the short overrunning period the direction of the motor is reversed and the result is that the beam of light travels in the opposite direction. The net result is that the beam of light, under the control of either motor, has a short back and forward oscillatory movement. Owing to the fine pitch of the screw 18 in comparison with the screw 17, the degree of movement of the beam when operating under the control of motor 20 is very small. In fact, it is so small that the position of the contact 16 at any part of the oscillation is sufficiently accurate for practical standardization and the fact that the motor 20 stops operating with the contact 16 in one extreme position or in the other extreme position, makes no practical difference in the record.

The contact 16 and the potentiometer 15 are for the purpose of automatically making corrections to compensate for changes in the "B" battery 64 "C" battery 65, and so forth. The purpose of the potentimeter 60 is to provide an adjustment whereby the contact 16 may be caused to operate in approximately the middle of the potentiometer 15. That is, any movement of the potentiometer 60 will result in the eventual displacement of the contact 16. The contact 60 provides an electromotive force to balance that generated by the output of the tube 12. It is prudent to point out that when the contact 62 is displaced, then the next time that the switch 92 closes, the motor 20 operates so as to make a corresponding translation of the point 16 towards the point of balance. If, however, the displacement of the contact 62 is considerable, the switch 92 is closed and the beam of light may be deflected a very large angle from the target of the photoelectric cell 26. The movement of the contact 16 tends to move the beam of light towards the neutral point at which the beam just touches the target of the photoelectric cell. Eventually the point of balance is reached and thereafter the contact 16 merely moves back and forward slightly upon the potentiometer 15. If the displacement of the contact 62 is very great, it may require several periods during which the switch 92 is closed before equilibrium is attained.

The liquid in the container 11 should be insulated from the ground. In order that I may obtain a continuous record of the pH of a liquid running through a conduit 127, for example, I provide a discharge pipe 128 which terminates above the container 11 and is adapted to discharge thereinto. In the pipe 128 I provide an electrically controlled valve 129. The container 11 is provided with an overflow pipe 130. The valve 129 is connected to the conductors 90 and 91 so that the valve 129 is opened each time the switch 92 is closed. This may be caused to happen as often as desired by providing any suitable number of cams 100 on the screw 98. When the valve 129 is thus opened, liquid flows from the conduit 127 into the container 11 and liquid is displaced from the container 11 so that the composition of the liquid in the container follows quite closely that of the liquid in the conduit. When the valve closes again there is no electrical connection between the liquid in the container and the ground. The container 11 may suitably be of glass and is supported on a shelf 131 suspended by rods 132 of insulating material.

My improved device may be employed for control purposes. Thus, I may place switches 133 and 134 in cooperative relation to the contact 14. These switches are so located that they define upper and lower limits of pH. When the switch 134 closes, it completes a circuit which effects corrective measures to lower the pH, for example. When the switch 133 is closed, the pH has reached its desired minimum. This switch completes a circuit which initiates operations to raise the pH to a point within the desired range.

The jewel lamps 37 and 38, the potentiometers 31, 42 and 60, the switches 36 and 69, and a receptacle 139 may be mounted on a panel 140 in front of the device. The receptacle 139 is intended for the reception of a plug 141 at the end of the cable 46 for the connection of the remote unit to the main instrument.

The glass electrode 10 may suitably be of the common bulb type and may comprise a platinum wire which is connected to the conductor 49 and dips into the liquid within the electrode, which may suitably consist of decinormal hydrochloric acid to which a small amount of quinhydrone has been added. The electrode 48 may be of the KCl, $HgCl_2$-Hg type. This electrode comprises a chamber 135 which contains successive layers of metallic mercury, mercuric chloride and saturated solution of potassium chloride. The potassium chloride solution layer communicates through a bent tube 136 into the liquid within the chamber 11. The tube 136 is provided with a stop cock 137. It is to be noted that this stop cock is normally closed during the operation of the device. However, sufficient liquid is present around the stop cock to maintain electrical connection between the liquid in the chamber 11 and the elements in chamber 135. The conductor 70 is connected to the mercury layer by means of a platinum wire 138 which extends through the lower end of the glass chamber 135.

I prefer to connect the conductor 70 to the conductor 49 through a condenser 142 which may suitably be located within the housing 47. I also prefer to ground the conductor 70. However, the instrument will operate satisfactorily if ungrounded and the condenser 142 be omitted. The condenser 142 may suitably have a capacity of 0.001 microfarad.

The operation of the device is as follows: The switch 69 is closed, which effects the supply of heater current to the tube 12 and power current to the lamp 23, to the clock motor 99, to the motors 19 and 20, to the amplifier 27 and, when the switch 92 is closed, as it is periodically, to the relay 89. In the null position of the galvanometer 32, the ray of light from the lamp 23 which is reflected by the mirror 24, just hits the target of the photoelectric cell 25. The switch 36 is thrown to the left and the contact 33 is moved in suitable direction to balance the cell 32 against the cell 35 by moving the contact 33. In a state of unbalance between the cells, one or other of the lamps 37 or 38 will light, indicating the direction in which the contact 33 should be moved. When this contact is located between the two positions at which the lamps 37 and 38 light, the cell 32 is substantially balanced against the cell 35.

The contact 34 is previously adjusted, preferably at the factory, for the particular scale of the chart 29, as has been previously described. Ordinarily, when operating with charts of the same dimensions, no change needs to be made with respect to the contact 34. The switch 36 is then closed to the right. The reading of the recorder should be standardized periodically by a buffer solution. For example, a solution having a pH of 7 may be placed in the container 11 and the instrument may be allowed to function. It should give a constant reading which may be somewhat different than 7 and this reading may be brought exactly to the 7 line by suitable movement of the contact 31. The chart 29 should be positioned with respect to time. This can be done, for example, by disconnecting the plate 97 from the nut member 112 and moving this nut member back to proper position on the screw 98. Or, if desired, the screw 98 may be disconnected from the clock motor 99 and manually turned back to locate the plate 97 at the proper position at the beginning line of the chart.

The automatic operation of the device is then allowed to proceed, liquid being admitted periodically into the tank 11 from the conduit 127. This liquid displaces a corresponding amount of liquid from the tank 11 which escapes through the overflow 130. Consequently, the liquid in the chamber 11 is always of substantially the same composition as the liquid passing through the conduit 127. At the beginning of the automatic operation the contact 14 will be displaced from its proper position of balance with respect to the pH of the liquid in the chamber 11.

The liquid in the chamber creates a certain voltage, depending upon its pH, between conductors 49 and 70. This voltage is opposite in direction to the algebraic sum of the voltages of the potentiometers 13 and 42 and the voltage applied to the grid is the algebraic sum of the voltages of the "C" battery 65, the potentiometer 15, potentiometer 42, potentiometer 13, and the glass electrode system. Consequently, the plate current has a certain value depending upon this algebraic sum. The resistance 59 in the plate circuit is very substantial, for example, of the order of 10,000 ohms. The drop of potential in this resistance will vary with the plate current. The potential across the resistance 59 is in series with the galvanometer 21 and the potentiometer 60, the voltage of which is opposite in direction to the voltage across the resistance 59.

When these two voltages neutralize each other, the galvanometer 21 is in its null or neutral position. If one is greater than the other, the galvanometer is displaced and the direction of its displacement controls the switch 28, with the result that the motor 19 is operated in one direction or the other. The direction of operation of the motor 19 effects a movement of the contact 14, which changes the effective voltage in the grid circuit provided by the potentiometer 13.

The plate current is consequently changed and the voltage drop across the resistance 59 is correspondingly altered in a direction which tends to bring it into equality with the voltage of the potentiometer 59. That is, the operation of the motor 19 is always in the direction tending to bring the beam of light to a point where it just touches the target of the photoelectric cell 26.

If it is assumed that the beam was initially off the target and that the motor 19 is moving the contact 14 in the appropriate direction, then the beam of light will hit the target and the switch 28 will change over so as to reverse the direction of rotation of the motor 19. It is to be noted that the motor will overrun slightly before it reverses. The reversal of the motor effects a reverse change of the contact 14 and the result is that the grid circuit will vary and the plate circuit will vary so that the beam moves off the target again. Again it overruns before the reversal of the motor 19 becomes effective. The result is that the pen 44 will oscillate up and down, producing a stout line, as best seen in Fig. 1. For convenience, I read the top of this thick line on the chart and I consider the top of this line when adjusting the reading with the aid of a buffer solution. It will readily be understood that any variation of the pH of the liquid in the container 11 will create a change of grid voltage and a change of plate voltage which will have the effect of necessitating a changed position of the contact 14 in order to keep the galvanometer oscillating at its zero position. That is, if the pH of the liquid increases, the oscillating position of the pen 44 will become elevated and vice versa.

During the normal operation the cam or cams 100 momentarily closes the switch 92 at regular intervals. The closing of the switch effects the opening of the valve 129 and the supply of a certain amount of liquid to the chamber 11. The closing of this switch also results in the energization of the relay 89 and the throwing of the switch 77 to the right, as viewed in Fig. 5. When the contacts 53 and 54 come into engagement, the relay 50 is energized and the contact 57 is connected directly to the grid. The contact 57 being connected directly to the contact 16, the potentiometers 13 and 42 and the glass electrode are cut out of the grid circuit and only the "C" battery 65 and the potentiometer 15 remain effective.

The galvanometer is now subjected to the plate current which results from the voltage of the "C" battery and the potentiometer 15. The relay 89 being energized and the switch 77 being moved to its right-hand position, as viewed in Fig. 5, the switch 28 is connected to the motor 20 instead of the motor 19 and consequently the pointer 16 moves to a position of balance and then oscillates at that balance. Owing to the fact that the screw 18 is much finer than the screw 17, the oscillations made by the contact 16 are much smaller than those made by the contact 14. The result is that any position of the contact 16 within its oscillating ambit is sufficiently accurate for the purpose of standardizing the circuits. When the switch 92 opens again, the contact 16 is left in the standardized position, the motor 19 is now rendered operative and the potentiometers 13 and 42 and the glass electrode are again introduced into the grid circuit. Consequently, when oscillating balance of the pen is obtained, the voltage created by the glass electrode exactly counter-balances the voltages introduced by the potentiometers 13 and 42. Since the potentiometer 42 remains set during operation, the potentiometer 13 necessarily varies in accordance with the variation of the voltage created by the glass electrode and hence the line drawn by the pen 44 accurately depicts changes of voltage created by the glass electrode and, consequently, the pH of the solution in the tank 11 for the time being.

During the operation of the device the pH of the liquid in the chamber 11 may be read directly by the scale 96. As has been hereinbefore pointed out, mechanical means, for example, switches 133 and 134, may be associated with the contact 14 so that they may initiate or control corrective measures in case the pH of the liquid tends to deviate beyond certain predetermined limits.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. An automatic recorder comprising a recording pen, continuously operating driving means adapted to move said pen in opposite directions, electrical means associated with the pen progressively changed with movements of the pen in opposite directions, and relay means controlled by said electrical means for reversing the driving means, said relay means being biased to cause movement of the pen in one direction and being adapted to be actuated by said electrical means to cause movement of the pen in the opposite direction.

2. An automatic recorder comprising a pen, continuously operating driving means for operating said pen in alternating directions, an electric circuit including means providing a voltage to be recorded and means for supplying voltage variable in accordance with the change of position of said pen, and relay means responsive to the sum of said voltages for reversing the driving means, said relay means being biased to cause movement of the pen in one direction and being responsive to said sum of the voltages, when sufficiently great, to cause movement of the pen in the opposite direction.

3. An automatic recorder comprising a pen, continuously operating driving means for operating said pen in alternating directions, an electric circuit including means providing a voltage to be recorded and means for supplying voltage variable in accordance with the change of position of said pen, a single photoelectric cell controlled by the joint action of said voltages, and relay means controlled by said photoelectric cell for reversing the driving means, said relay means being biased to cause movement of the pen in one direction and being adapted to be energized by said photoelectric cell to cause movement of the pen in the opposite direction.

4. In an automatic recorder, a galvanometer adapted to project a beam of light, a reversing driven member adapted continuously to change the current flowing through the galvanometer, a photoelectric cell adapted to be impinged by said beam in one position of the galvanometer, a relay biased to cause said driven member to move in a direction to bring the beam towards the photoelectric cell and adapted to be energized by the photoelectric cell to reverse the driven member continuously, means providing an electrical effect to be measured tending to change the current flowing through the galvanometer, and means maintaining the galvanometer current within a substantially constant range.

5. An automatic recorder comprising a moving chart, a pen cooperating therewith, a reversible motor adapted to move said pen in opposite directions, a potentiometer controlled by said motor in correlation with the pen movements to provide a voltage, means for providing a variable voltage to be measured in series with the potentiometer, a galvanometer controlled by said voltages, and relay means controlled by said galvanometer and controlling the direction of the motor, whereby movements of the galvanometer in one direction immediately actuate the relay means to effect reversal of the galvanometer movement, whereby the galvanometer is maintained in a state of continuous oscillation within close limits.

6. An automatic recorder comprising a moving chart, a pen cooperating therewith, a reversible motor adapted to move said pen in opposite directions, a potentiometer controlled by said motor in correlation with the pen movements, means for providing a variable voltage to be measured in series with the potentiometer, a galvanometer controlled by said voltage and the voltage of the potentiometer, a photocell adapted to be energized by said galvanometer, and relay means biased to control the actuation of the motor in one direction and adapted to be energized by said photocell for reversing the motor thereby causing the galvanometer to swing continuously within close limits.

7. An automatic recorder comprising a moving chart, a pen cooperating therewith, a continuously operating motor adapted to move said pen in opposite directions, a thermionic tube having a grid circuit and a plate circuit, a potentiometer controlled by said motor in correlation with the pen movements and means for providing a variable voltage to be measured in series in the grid circuit, a galvanometer in the plate circuit, and relay means adapted to reverse the motor repeatedly as the galvanometer swings within close limits.

8. An automatic recorder comprising a moving chart, a pen cooperating therewith, a reversible motor adapted to move said pen in opposite directions, a potentiometer controlled by said motor in correlation with the pen movements to provide a voltage, a second potentiometer in series with first said potentiometer to provide a voltage, a second reversible motor controlling last said potentiometer, means providing a variable voltage to be measured in series with the potentiometers, a galvanometer controlled by said voltages, relay means adapted to reverse the first said motor repeatedly during its period of operation as the galvanometer swings within close limits, and periodically operable switching means for cutting out the first said potentiometer and the means providing the variable voltage to be measured and for connecting the relay means to the second motor whereby the second motor is reversed repeatedly during its period of operation and the galvanometer is caused to swing in close limits at substantially the same position.

9. An automatic recorder comprising a moving chart, a pen cooperating therewith, a reversible motor adapted to move said pen in opposite directions, a thermionic tube having a grid circuit and a plate circuit, a potentiometer in the grid circuit controlled by said motor in correlation with the pen movements, a second potentiometer and means for providing a variable voltage to be measured in said grid circuit, a second reversible motor controlling said second potentiometer, a galvanometer in the plate circuit, relay means adapted to reverse the first said motor repeatedly during its period of operation as the galvanometer swings between close limits, and automatic switching means operable periodically to cut out the first said potentiometer and the means providing the variable voltage to be measured and for connecting the relay means to the second motor whereby the second motor is reversed repeatedly during its period of operation and the galvanometer is caused to swing in close limits at substantially the same position.

10. An automatic recorder comprising a moving chart, a pen cooperating therewith, a reversible motor adapted to move said pen in opposite directions, a thermionic tube having a grid circuit and a plate circuit, a potentiometer in the grid circuit controlled by said motor in correlation with the pen movements, a second potentiometer and hydrogen ion responsive means for providing a variable voltage to be measured in said grid circuit, a second reversible motor controlling said second potentiometer, means for supplying fluid to be tested in said hydrogen ion responsive means, a galvanometer in said plate circuit, a photo cell adapted to be energized by said galvanometer, an amplifier connected to said photocell, a relay controlled by said amplifier to reverse the first said motor repeatedly during its period of operation as the galvanometer swings between close limits, and automatic switching means for periodically actuating said fluid supply means and cutting out the first said potentiometer and the hydrogen ion voltage and for connecting the relay to the second motor whereby the second motor is reversed repeatedly during its period of operation and the galvanometer is caused to swing in close limits at substantially the same position.

DONALD H. CAMERON.